US008670402B2

(12) United States Patent
Hu et al.

(10) Patent No.: US 8,670,402 B2
(45) Date of Patent: Mar. 11, 2014

(54) METHOD AND AN APPARATUS FOR TRANSMITTING PHYSICAL RANDOM ACCESS CHANNEL SIGNAL

(75) Inventors: Yanhui Hu, Shenzhen (CN); Xinyu Zhang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/380,924

(22) PCT Filed: Mar. 31, 2011

(86) PCT No.: PCT/CN2011/072348
§ 371 (c)(1),
(2), (4) Date: Dec. 27, 2011

(87) PCT Pub. No.: WO2012/027985
PCT Pub. Date: Mar. 8, 2012

(65) Prior Publication Data
US 2013/0148590 A1 Jun. 13, 2013

(30) Foreign Application Priority Data

Aug. 30, 2010 (CN) .......................... 2010 1 0273915

(51) Int. Cl.
| | |
|---|---|
| H04W 4/00 | (2009.01) |
| H04J 11/00 | (2006.01) |
| H04B 7/00 | (2006.01) |
| H04W 72/04 | (2009.01) |
| H04W 76/00 | (2009.01) |
| H04L 5/14 | (2006.01) |
| H04L 27/26 | (2006.01) |
| H04W 88/08 | (2009.01) |

(52) U.S. Cl.
CPC .............. *H04W 72/04* (2013.01); *H04W 76/00* (2013.01); *H04L 5/14* (2013.01); *H04L 27/265* (2013.01); *H04W 88/08* (2013.01)
USPC ............................. 370/329; 370/210; 370/277

(58) Field of Classification Search
CPC ..... H04W 72/04; H04W 76/00; H04W 88/08; H04L 5/14; H04L 27/265
USPC ......................................................... 370/329
See application file for complete search history.

(56) References Cited

U.S. PATENT DOCUMENTS

2010/0020905 A1\* 1/2010 Mansour et al. .............. 375/343
2012/0289178 A1\* 11/2012 Matsumura et al. .......... 455/403

FOREIGN PATENT DOCUMENTS

| CN | 1493073 A | 4/2004 |
|---|---|---|
| CN | 1568586 A | 1/2005 |
| CN | 101183895 A | 5/2008 |
| CN | 101388699 A | 3/2009 |
| CN | 101394226 A | 3/2009 |

\* cited by examiner

OTHER PUBLICATIONS

International Search Report for PCT/CN2011/072348 dated Jun. 3, 2011.

*Primary Examiner* — Faruk Hamza
*Assistant Examiner* — Abu-Sayeed Haque
(74) *Attorney, Agent, or Firm* — Ling Wu; Stephen Yang; Ling and Yang Intellectual Property

(57) ABSTRACT

A method and an apparatus for transmitting a physical random access channel signal are disclosed by in the present invention. The method includes: when transmitting a physical random access channel (PRACH) signal, a terminal carries out pre-compensation for the frequency domain signal according to the estimated frequency spectrum gain of downlink channel, converting it into the time domain signal and transmits it to the base station. In the present invention, by way of measuring the spectral response of the downlink channel and carrying out pre-compensation for the frequency selective fading when transmitting the PRACH signal, using the symmetry of the uplink channel and downlink channel in the TD system, the adverse effect on the PRACH detection due to multipath channel could be effectively eliminated and the detection probability of the PRACH signal and measuring accuracy of transmission delay could be improved.

11 Claims, 1 Drawing Sheet

METHOD AND AN APPARATUS FOR TRANSMITTING PHYSICAL RANDOM ACCESS CHANNEL SIGNAL

TECHNICAL FIELD

The present invention relates to wireless communication technical field, and specifically relates to a method an apparatus for transmitting a physical random access channel signal.

BACKGROUND OF THE RELATED ART

Orthogonal Frequency Division Multiplexing (OFDM) technology is widely applied in the next generation wireless communication system like Long Term Evolution (LTE), because of the advantage of high frequency spectrum efficiency and eliminating multipath fading effectively. The principle of the OFDM is to divide a broadband transmission channel into a series of parallel narrowband sub-channels whose frequency spectrums overlaps mutually. In order to keep the orthogonality between sub-channels and avoid the mutual interference between sub-channels, the requirements of OFDM technology for synchronization of time and frequency are high.

In the uplink channel of LTE, the base station receives transmission signals from different user equipment (UE), and the time when the transmission signals from UE arrives at the base station should be the same, so avoid the mutual interference between the signals of different UE. The distances between different UEs and the base station being different, this requires different UEs transmitting signals at different time, so that the time when the transmission of signal from the UE that is farther away from the base station is relatively earlier. While the UE is unable to measure the distance from the base station, the corresponding technology applied in the LTE is: in the case that the UE accesses the system for the first time or UE can't keep the synchronization with the base station, the physical random access channel (PRACH) signal is transmitted to the base station, and the base station detects the time when the PRACH signal arrives and feedback the time advance (TA) of the transmission time required by the UE to the UE for corresponding adjustment.

The PRACH signal in the LTE is based on the ZC (Zadoff-Chu) sequence, a ZC sequence with the length of $N_{ZC}$ and base of u is:

$$x_{u,k} = e^{-j\pi uk(k+1)/N_{ZC}}, 0 \leq k \leq N_{ZC}-1$$

It is because of the following characters that the ZC sequence is chosen:

for the same base, the ZC sequences generated by different cyclic shifts are orthogonal;

for different bases, the correlation value between the ZC sequences is constant.

After receiving the PRACH signal, the base station tries carrying out the correlation operation of the received signal and the PRACH signal at different time by using different ZC sequences. If the obtained correlation value is greater than a certain threshold, it is believed that the transmitted PRACH signal is detected, and the time when the PRACH signal arrives at the base station is obtained at the same time, that is, the transmission delay from the UE to the base station is obtained.

In the wireless communication channel, the transmission signal is transmitted to the base station by different paths which have different lengths. Therefore, what the base station receives is a series of PRACH signals with different time delays. Since a series of PRACH signals are orthogonal, the base station detects the PRACH signals with greater energy. This will lead to unfavorable results as follows:

1. The energy of the transmission signal is dispersed in every path, which decreases the probability of the base station detecting the PRACH signals;

2. Since multiple paths are detected, the base station could not judge the transmission delay accurately from the UE to the base station.

SUMMARY OF THE INVENTION

The technical problem to be solved by the present invention is to provide a method and an apparatus for transmitting physical random access channel signal, to improve the detection probability of the PRACH signal in the multipath channel and the measuring accuracy of transmission delay.

In order to solve the above-mentioned problem, a method for transmitting physical random access channel signal is provided by the present invention, the method comprises:

when transmitting a physical random access channel (PRACH) signal, a terminal carrying out pre-compensation for a frequency domain signal according to an estimated frequency spectrum gain of a downlink channel, and converting into a time domain signal and transmitting it to a base station.

Preferably, the step of carrying out pre-compensation for the frequency domain signal according to the estimated frequency spectrum gain of the downlink channel comprises:

the terminal estimating the frequency spectrum gain of the downlink channel;

generating a ZC sequence and implementing a Fast Fourier Transform (FFT) operation for the generated ZC sequence to generate the frequency domain signal;

mapping the generated frequency domain signal to a sub-carrier allocated for the PRACH signal, and carrying out pre-compensation for the frequency domain signal mapped to each subcarrier according to the frequency spectrum gain.

Preferably, after carrying out the pre-compensation for the frequency domain signal, implement an Inverse Fast Fourier Transform (IFFT) operation for the pre-compensated frequency domain signal to obtain a time domain signal;

after inserting a cyclic prefix, transmit the time domain signal to the base station.

Preferably, the step of carrying out the pre-compensation for the frequency domain signal according to the frequency spectrum gain comprises:

multiplying the frequency domain signal mapped to each subcarrier by a reciprocal of the frequency spectrum gain of the subcarrier.

wherein: if the frequency spectrum gain of frequency z estimated by the terminal is $h_z$, carry out the pre-compensation for the frequency domain signal S(m) at the subcarrier m as follows:

$$\tilde{S}(m) = S(m)/h_{(m+k_0)\Delta f_{RA}}$$

wherein $\tilde{S}(m)$ is the pre-compensated frequency domain signal at the subcarrier m, $k_0$ is an initial frequency of transmission of the PRACH signal, and $\Delta f_{RA}$ is a frequency interval between adjacent subcarriers of the PRACH signal.

An apparatus for transmitting physical random access channel signal applied in Time Division Long Term Evolution (TD-LTE) communication system is provided by the present invention, the apparatus comprises:

a channel estimation module, configured to estimate a frequency spectrum gain of a downlink channel and transmit the frequency spectrum gain to a frequency spectrum gain pre-compensation module;

a frequency spectrum gain pre-compensation module, configured to carry out pre-compensation for a frequency domain signal according to the frequency spectrum gain.

Preferably, the frequency spectrum gain pre-compensation module is further configured to carry out pre-compensation for the frequency domain signal mapped to each sub-carrier allocated for the PRACH signal according to the frequency spectrum gain.

Preferably, the frequency spectrum gain pre-compensation module is further configured to carry out pre-compensation for the frequency domain signal mapped to each sub-carrier as follows:

multiplying the frequency domain signal mapped to each sub-carrier by a reciprocal of the frequency spectrum gain of the subcarrier.

The apparatus further comprises:

a ZC sequence generation module, configured to generate a ZC sequence;

a FFT module, configured to implement a Fast Fourier Transform operation for the generated ZC sequence to generate a frequency domain signal, and send the frequency domain signal to the frequency spectrum gain pre-compensation module;

an IFFT module, configured to implement an Inverse Fast Fourier Transform operation for the pre-compensated frequency domain signal to obtain a time domain signal;

a CP inserting module, configured to insert a cyclic prefix into the obtained time domain signal;

a radio frequency sub-module, configured to transmit the time domain signal to a base station.

The frequency spectrum gain pre-compensation module is further configured to:

if the frequency spectrum gain of frequency z estimated by the terminal is $h_z$, carry out pre-compensation for the frequency domain signal $S(m)$ at the subcarrier m as follows:

$$\tilde{S}(m)=S(m)/h_{(m+k_0)\Delta f_{RA}}$$

wherein $\tilde{S}(m)$ is the pre-compensated frequency domain signal at the subcarrier m, $k_0$ is an initial frequency of transmission of the PRACH signal, and $\Delta f_{RA}$ is a frequency interval between adjacent subcarriers of the PRACH signal.

To sum up, a new structure for transmitting the random access signal and the relevant algorithm in a TD-LTE system is provided by the present invention. By way of measuring the spectral response of the downlink channel and carrying out pre-compensation for the frequency selective fading when transmitting the PRACH signal, using the symmetry of the uplink channel and downlink channel in the TD system, in the Time Division-LTE (TD-LTE) system, the adverse effect on the PRACH detection due to multipath channel could be effectively eliminated and the detection probability of the PRACH signal and measuring accuracy of transmission delay could be improved by applying the technical scheme of the present invention.

PREFERRED EMBODIMENTS OF THE PRESENT INVENTION

Figure 1:
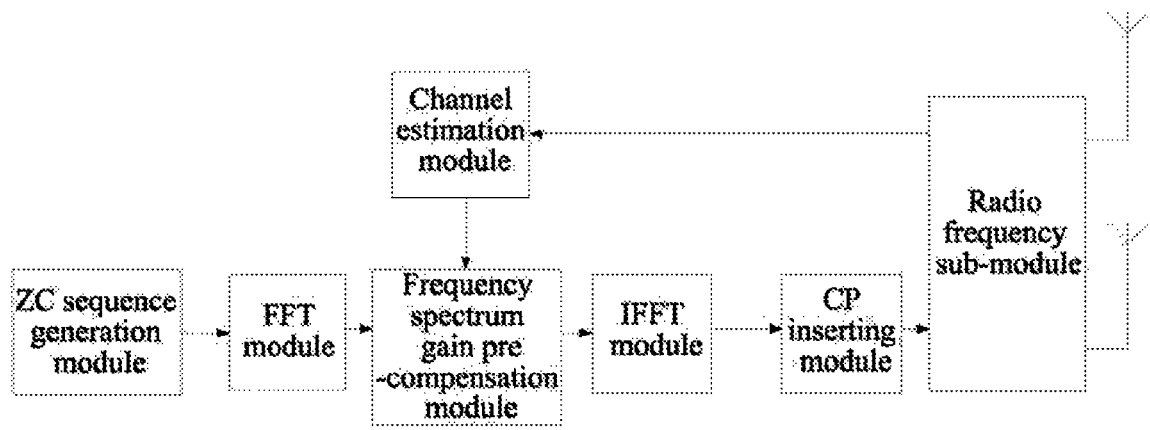
FIG. 1 is schematic block diagram of the apparatus for transmitting a PRACH signal in accordance with the embodiment of the present invention.

The key idea of the present invention is that: in the TD-LTE system, using the symmetry of the uplink channel and downlink channel in the TD system, the UE obtains the frequency spectrum gain of the channel by measuring the spectral response of downlink channel, and carries out pre-compensation of the frequency spectrum gain for the transmitted uplink PRACH signal to make the frequency spectrum of the signal received by the base station smooth. That is to say, the PRACH signal transmitted by the UE is sent to the base station by an equivalent single-path channel, therefore the detection probability of the PRACH signal and the measuring accuracy of the transmission delay is improved effectively.

On the basis of the above-mentioned idea, a method for transmitting physical random access channel signal is provided by the present invention, specifically utilizing the following technical schemes:

a terminal carries out pre-compensation for the frequency domain signal according to the estimated frequency spectrum gain of the downlink channel when transmitting a PRACH signal, converting into a time domain signal and transmits it to the base station.

Furthermore, the method specifically includes that:

the terminal estimates the frequency spectrum gain of the downlink channel;

generate a ZC sequence, and implement a FFT operation for the generated ZC sequence to generate a frequency domain signal;

map the generated frequency domain signal to the subcarrier allocated for the PRACH signal, and carry out pre-compensation for the frequency domain signal mapped to each subcarrier according to the frequency spectrum gain.

Furthermore, after carrying out pre-compensation for the frequency domain signal, implement the IFFT operation for the pre-compensated frequency domain signal to obtain the time domain signal;

after inserting a cyclic prefix, transmit the time domain signal to the base station.

Furthermore, the step of carrying out pre-compensation for the frequency domain signal according to the frequency spectrum gain specifically includes:

multiplying the frequency domain signal mapped to each subcarrier by the reciprocal of the frequency spectrum gain of the subcarrier.

Furthermore, if the frequency spectrum gain of frequency z estimated by the terminal is $h_z$, carry out pre-compensation for the PRACH signal $S(m)$ at the subcarrier m as follows:

$$\tilde{S}(m)=S(m)/h_{(m+k_0)\Delta f_{RA}}$$

wherein $\tilde{S}(m)$ is the pre-compensated frequency domain signal at the subcarrier m, $k_0$ is the initial frequency of the transmission of the PRACH signal, and $\Delta f_{RA}$ is the frequency interval between adjacent subcarriers of the PRACH signal.

The implementation of the technical scheme of the present invention will be further described in detail in combination with accompany drawings and specific embodiments as follows.

The method for transmitting the PRACH signal provided by the embodiment of the present invention includes the following steps:

Step one: UE estimates the frequency spectrum gain of downlink channel;

Step two: generate a ZC sequence, and implement a Fast Fourier Transform (FFT) operation for the generated ZC sequence to generate a frequency domain signal;

Step three: map the generated frequency domain signal to the transmission resources of the PRACH (the subcarrier allocated for the PRACH signal), and multiply the signal at each subcarrier by the reciprocal of the frequency spectrum gain of the subcarrier;

Step four: carry out Inverse Fast Fourier Transform (IFFT) for the obtained frequency domain signal to obtain the time domain signal of the baseband;

Step five: insert a cyclic prefix (CP);

Step six: output the time domain signal to the radio frequency sub-module, and transmit the time domain signal to the base station by a transmitting antenna.

As shown in FIG. 1, the apparatus for transmitting the physical random access channel signal provided by the embodiment of the present invention includes a frequency spectrum gain pre-compensation module, and a channel estimation module, ZC sequence generation module, CP inserting module, FFT module, IFFT module and radio frequency sub-module (RFC). For the channel estimation module, ZC sequence generation module, CP inserting module, FFT module and IFFT module, the existing function module can be used, the main function is as follows:

the channel estimation module is configured to carry out channel estimation;

the ZC sequence generation module is configured to generate a ZC sequence;

the FFT module is configured to implement a FFT operation for the generated ZC sequence to generate a frequency domain signal;

the IFFT module is configured to implement an IFFT operation for the obtained frequency domain signal to obtain a time domain signal;

the CP inserting module is configured to insert a CP and output the time domain signal to the RFC;

the radio frequency sub-module is configured to transmit the time domain signal to the base station by a transmitting antenna.

Moreover, the above-mentioned modules have the same basic functions as existing modules, in addition, the channel estimation module is further configured to estimate the frequency spectrum gain of downlink channel and send it to the frequency spectrum gain pre-compensation module;

the frequency spectrum gain pre-compensation module is configured to carry out pre-compensation for the frequency domain signal according to the frequency spectrum gain.

Additionally, the frequency spectrum gain pre-compensation module is further configured to carry out pre-compensation for the frequency domain signal mapped to each subcarrier allocated for the PRACH signal according to the frequency spectrum gain.

Additionally, the frequency spectrum gain pre-compensation module is further configured to carry out pre-compensation on the frequency domain signal mapped to each subcarrier as follows:

multiply the frequency domain signal mapped to each subcarrier by the reciprocal of the frequency spectrum gain of the subcarrier.

Additionally, the frequency spectrum gain pre-compensation module is further configured to:

if the frequency spectrum gain of frequency z estimated by the terminal is $h_z$, carry out pre-compensation on the frequency domain signal $S(m)$ at the subcarrier m as follows:

$$\tilde{S}(m)=S(m)/h_{(m+k_0)\Delta f_{RA}}$$

wherein $\tilde{S}(m)$ is the pre-compensated frequency domain signal at the subcarrier m, $k_0$ is the initial frequency of the transmission of the PRACH signal, and $\Delta f_{RA}$ is the frequency interval between adjacent subcarriers of the PRACH signal.

Figure 2:
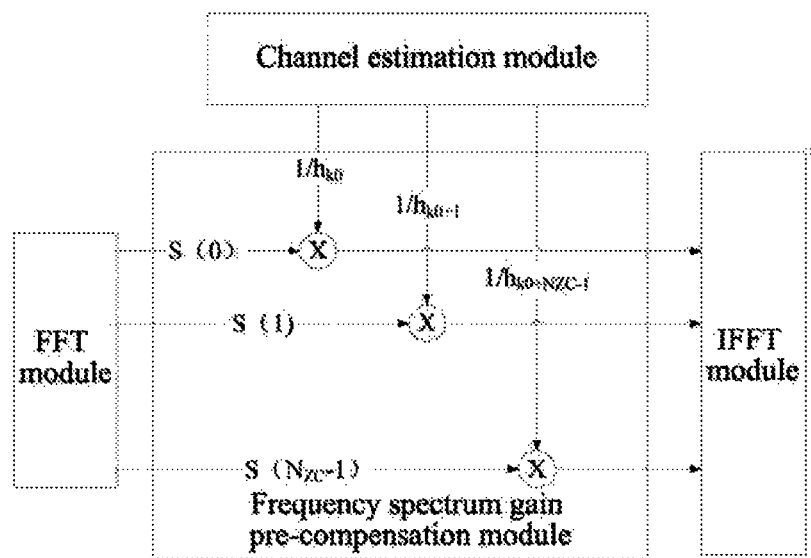
FIG. 2 is schematic diagram of the frequency spectrum gain pre-compensation module carrying out pre-compensation for the frequency domain signal in accordance with the embodiment of the present invention.

FIG. 2 shows a schematic diagram of the frequency spectrum gain pre-compensation module carrying out pre-compensation, provided by the embodiment of the present invention. As shown in FIG. 2, a time domain sequence with the length of $N_{ZC}$ is transformed to the frequency domain by FFT with $N_{ZC}$ points and input to the channel gain pre-compensation module. In this module, after the signal at each of subcarriers ($S(0)$, $S(1)$, ... $S(N_{ZC}-1)$) is multiplied by the reciprocal of the channel gain ($h_{k_0}$, $h_{k_0+1}$, $h_{k_0+N_{ZC}-1}$) at this subcarrier, it is output to the IFFT module with $N_{ZC}$ points. The IFFT module implements an IFFT operation for the input frequency domain signal for which the channel gain pre-compensation has been carried out, thereby the time domain signal is obtained.

The implementation of method for transmitting the PRACH signal in the present invention is further described in detail in combination with specific embodiments.

In TD-LTE, take the PRACH signal with transmission preamble Format 0 as example, $N_{ZC}=839$. It should be noted that any other preamble format is also available for the technical scheme involved in the present invention rather than limited to Format 0. Assuming the base of the ZC sequence is u, the generated ZC sequence is:

$$x_{u,k}=e^{-j\pi u k(k+1)/N_{ZC}}, 0 \le k \le N_{ZC}-1$$

Assuming the cyclic shift is $C_v$ $$x_{u,v,k}=x_{u,(k+C_v) \bmod N_{ZC}}$$

After a FFT operation, the generated frequency domain signal at the subcarrier m is:

$$S(m) = \sum_{k=0}^{N_{ZC}-1} x_{u,v,k} \cdot e^{-j\frac{2\pi mk}{N_{ZC}}}$$

Assuming the frequency spectrum gain of the frequency z obtained by the channel estimation module is $h_z$, carry out the frequency spectrum gain pre-compensation for the generated frequency domain signal as follows:

$$\tilde{S}(m)=S(m)/h_{(m+k_0)\Delta f_{RA}}$$

wherein $\tilde{S}(m)$ is the pre-compensated frequency domain signal at the subcarrier m, $k_0$ is the initial frequency of the transmission of the PRACH signal, and $\Delta f_{RA}$ is the frequency interval between adjacent subcarriers of the PRACH signal.

A time domain signal of the baseband is obtained by an IFFT operation:

$$s(t) = \sum_{m=0}^{N_{ZC}} \tilde{S}(m) \cdot e^{j2\pi(m+k_0)\Delta f_{RA} t}$$

after CP is inserted, the time domain signal is transmitted to the base station by a transmitting antenna.

What is described above are only preferred embodiments of the present invention, but not intended to limit the present invention. There could be many other embodiments of the present invention, without departing from the spirit and essence of the present invention, those skilled in the art may make various corresponding variations and changes of the present invention which should fall into the protection scope of the appended claims of the present invention.

Those skilled in the art could appreciate that part or all of steps of the above method may be implemented by instructing the corresponding hardware with program. The program may be stored in computer-readable storage medium such as read-only memory, magnetic disk or compact disk. Optionally, part or all of the steps of the above-mentioned embodiments may be implemented by using one or more integrated circuits. Correspondingly, each module/element of the above embodiment may be implemented in the form of hardware or in the form of software function modules. The present invention is not limit to the combination of hardware and software in any specific form.

INDUSTRIAL APPLICABILITY

A new structure for transmitting the random access signal and relevant algorithm in a TD-LTE system is provided by the present invention. By way of measuring the spectral response of the downlink channel and carrying out pre-compensation for the frequency selective fading when transmitting the PRACH signal, using the symmetry of the uplink channel and downlink channel in the TD system, in the Time Division-LTE (TD-LTE) system, the adverse effect on the PRACH detection due to multipath channel could be effectively eliminated and the detection probability of the PRACH signal and measuring accuracy of transmission delay could be improved by applying the technical scheme of the present invention.

What is claimed is:

1. A method for transmitting a physical random access channel signal, the method comprising: when a terminal transmits a physical random access channel (PRACH) signal, after carrying out pre-compensation for a frequency domain signal according to an estimated frequency spectrum gain of a downlink channel, implementing an Inverse Fast Fourier Transform operation for the pre-compensated frequency domain signal to obtain the time domain signal; after inserting a cyclic prefix, transmitting the time domain signal to the base station; the step of carrying out the pre-compensation for the frequency domain signal according to the frequency spectrum gain comprises: multiplying the frequency domain signal mapped to each subcarrier by a reciprocal of the frequency spectrum gain of the subcarrier Wherein if the frequency spectrum gain of frequency z estimated by the terminal is $h_z$, carry out the pre-compensation for the frequency domain signal $S(m)$ at the subcarrier m as follows:

$$\tilde{S}(m)=S(m)/h_{(m+k_0)\Delta f_{RA}}$$

wherein $\tilde{S}(m)$ is the pre-compensated frequency domain signal at the subcarrier m, $k_0$ is an initial frequency of transmission of the PRACH signal, and $\Delta f_{RA}$ is a frequency interval between adjacent subcarriers of the PRACH signal.

2. The method according to claim 1, wherein the step of carrying out pre-compensation for the frequency domain signal according to the estimated frequency spectrum gain of the downlink channel comprises: the terminal estimating a frequency spectrum gain of the downlink channel; generating a ZC sequence and implementing a Fast Fourier Transform operation for the generated ZC sequence to generate the frequency domain signal; mapping the generated frequency domain signal to a subcarrier allocated for the PRACH signal, and carrying out pre-compensation for the frequency domain signal mapped to each subcarrier according to the frequency spectrum gain.

3. The method according to claim 2, wherein the method further comprises: after carrying out the pre-compensation for the frequency domain signal, implementing an Inverse Fast Fourier Transform operation for the pre-compensated frequency domain signal to obtain the time domain signal; after inserting a cyclic prefix, transmitting the time domain signal to the base station.

4. The method according to claim 3, wherein the step of carrying out the pre-compensation for the frequency domain signal according to the frequency spectrum gain comprises: multiplying the frequency domain signal mapped to each subcarrier by a reciprocal of the frequency spectrum gain of the subcarrier.

5. The method according to claim 4, wherein if the frequency spectrum gain of frequency z estimated by the terminal is $h_z$, carry out the pre-compensation for the frequency domain signal $S(m)$ at the subcarrier m as follows:

$$\tilde{S}(m)=S(m)/h_{(m+k_0)\Delta f_{RA}}$$

wherein $\tilde{S}(m)$ is the pre-compensated frequency domain signal at the subcarrier m, $k_0$ is an initial frequency of transmission of the PRACH signal, and $\Delta f_{RA}$ is a frequency interval between adjacent subcarriers of the PRACH signal.

6. An apparatus for transmitting a physical random access channel signal, applied in Time Division Long Term Evolution (TD-LTE) communication system, the apparatus comprising: a channel estimation module, configured to estimate a frequency spectrum gain of a downlink channel and transmit the frequency spectrum gain to a frequency spectrum gain pre-compensation module; the frequency spectrum gain pre-compensation module, configured to carry out pre-compensation for a frequency domain signal mapped to each sub-carrier allocated for a PRACH signal according to the frequency spectrum gain; wherein if the frequency spectrum gain of frequency z estimated by a terminal is $h_z$, carry out pre-compensation for the frequency domain signal $S(m)$ at the subcarrier m as follows:

$$\tilde{S}(m)=S(m)/h_{(m+k_0)\Delta f_{RA}}$$

wherein $\tilde{S}(m)$ is the pre-compensated frequency domain signal at the subcarrier m, $k_0$ is an initial frequency of transmission of the PRACH signal, and $\Delta f_{RA}$ is a frequency interval between adjacent subcarriers of the PRACH signal.

7. The apparatus according to claim 6, wherein the frequency spectrum gain pre-compensation module is further configured to carry out pre-compensation for the frequency domain signal mapped to each sub-carrier as follows: multiplying the frequency domain signal mapped to each sub-carrier by a reciprocal of the frequency spectrum gain of the subcarrier.

8. The apparatus according to claim 7, wherein the apparatus further comprises: a ZC sequence generation module, configured to generate a ZC sequence; a Fast Fourier Transform (FFT) module, configured to implement a Fast Fourier Transform operation for the generated ZC sequence to generate the frequency domain signal, and send the frequency domain signal to the frequency spectrum gain pre-compensation module; an Inverse Fast Fourier Transform (IFFT) module, configured to implement an Inverse Fast Fourier Transform operation for the pre-compensated frequency domain signal to obtain a time domain signal; a CP inserting module, configured to insert a cyclic prefix into the obtained time domain signal; a radio frequency sub-module, configured to transmit the time domain signal to a base station.

9. The apparatus according to claim 7, wherein: the frequency spectrum gain pre-compensation module is further configured to: if the frequency spectrum gain of frequency z estimated by a terminal is $h_z$, carry out pre-compensation for the frequency domain signal S(m) at the subcarrier m as follows:

$$\tilde{S}(m)=S(m)/h_{(m+k_0)\Delta f_{RA}}$$

wherein $\tilde{S}(m)$ is the pre-compensated frequency domain signal at the subcarrier m, $k_0$ is an initial frequency of transmission of the PRACH signal, and $\Delta f_{RA}$ is a frequency interval between adjacent subcarriers of the PRACH signal.

10. The apparatus according to claim 6, wherein the apparatus further comprises: a ZC sequence generation module, configured to generate a ZC sequence; a Fast Fourier Transform (FFT) module, configured to implement a Fast Fourier Transform operation for the generated ZC sequence to generate the frequency domain signal, and send the frequency domain signal to the frequency spectrum gain pre-compensation module; an Inverse Fast Fourier Transform (IFFT) module, configured to implement an Inverse Fast Fourier Transform operation for the pre-compensated frequency domain signal to obtain a time domain signal; a CP inserting module, configured to insert a cyclic prefix into the obtained time domain signal; a radio frequency sub-module, configured to transmit the time domain signal to a base station.

11. The apparatus according to claim 6, wherein the apparatus further comprises: a ZC sequence generation module, configured to generate a ZC sequence; a Fast Fourier Transform (FFT) module, configured to implement a Fast Fourier Transform operation for the generated ZC sequence to generate the frequency domain signal, and send the frequency domain signal to the frequency spectrum gain pre-compensation module; an Inverse Fast Fourier Transform (IFFT) module, configured to implement an Inverse Fast Fourier Transform operation for the pre-compensated frequency domain signal to obtain a time domain signal; a CP inserting module, configured to insert a cyclic prefix into the obtained time domain signal; a radio frequency sub-module, configured to transmit the time domain signal to a base station.

* * * * *